United States Patent [19]
Kulczycki et al.

[11] Patent Number: 6,078,252
[45] Date of Patent: *Jun. 20, 2000

[54] VEHICLE WIRELESS SWITCHING SYSTEM

[75] Inventors: Jeffrey L. Kulczycki; Timothy S. Roddy, both of Plymouth; James D. Dowd, Farmington Hills, all of Mich.

[73] Assignee: Lear Automotive Dearborn, Inc., Southfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,322

[22] Filed: Mar. 28, 1997

[51] Int. Cl.$^7$ ..................................................... B60Q 1/00
[52] U.S. Cl. ..................... 340/425.5; 340/438; 340/475; 340/539
[58] Field of Search .............................. 340/425.5, 539, 340/438, 825.22, 825.69, 825.72, 426, 475, 825.36, 825.32, 825.3, 825.31, 825.73, 825.76

[56] References Cited

U.S. PATENT DOCUMENTS

| | | | |
|---|---|---|---|
| 4,257,038 | 3/1981 | Rounds et al. | 340/539 |
| 4,405,924 | 9/1983 | Shinoda et al. | 340/825.72 |
| 4,426,637 | 1/1984 | Apple et al. | 340/825.65 |
| 4,684,918 | 8/1987 | Solomon | 340/475 |
| 4,908,604 | 3/1990 | Jacob | 340/539 |
| 5,103,221 | 4/1992 | Memmola | 340/825.31 |
| 5,278,547 | 1/1994 | Suman et al. | 340/825.32 |
| 5,319,698 | 6/1994 | Glidewell et al. | 340/426 |
| 5,382,948 | 1/1995 | Richmond | 340/825.36 |
| 5,471,668 | 11/1995 | Soenen et al. | 340/825.72 |
| 5,517,187 | 5/1996 | Bruwer et al. | 340/825.3 |
| 5,543,778 | 8/1996 | Stouffer | 340/539 |
| 5,583,485 | 12/1996 | Van Lente et al. | 340/525 |
| 5,627,540 | 5/1997 | Deguchi et al. | 341/6 |
| 5,650,774 | 7/1997 | Drori | 340/825.32 |
| 5,661,651 | 8/1997 | Geschke et al. | 364/424.034 |

FOREIGN PATENT DOCUMENTS

| | | |
|---|---|---|
| 0088953 | of 1983 | European Pat. Off. . |
| 0348726 | of 1989 | European Pat. Off. . |
| 4126840 | of 1991 | Germany . |

*Primary Examiner*—Nina Tong
*Attorney, Agent, or Firm*—Brooks & Kushman P.C.

[57] ABSTRACT

A vehicle switching system includes a transmitter generating signals based upon activation of one of a plurality of switches. Switches mounted on vehicle components in the vehicle are each associated with a predetermined vehicle function. A receiver in the vehicle receives the signal from the transmitter and activates the predetermined vehicle function.

11 Claims, 1 Drawing Sheet

VEHICLE WIRELESS SWITCHING SYSTEM

BACKGROUND OF THE INVENTION

The present invention relates generally to a switching system for a vehicle which is wireless, permitting location of the switches in remote locations in the vehicle.

Current vehicles include numerous electrical features which require sensor-activated or user-activated switches. The wiring required by these switches increases the time for assembly and the cost and weight of the vehicle. Further, each connection between wires provides a potential failure point in the system.

Switches mounted on movable vehicle components such as doors, visors, and the steering wheel are difficult to wire. The number of wires to these locations can be reduced by multiplexing a group of switches in one of these locations; however, the additional multiplexer increases the cost of the switching system.

SUMMARY OF THE INVENTION

The present invention provides a wireless switching system utilizing remote transmitters and a receiver. A plurality of switch clusters each comprise a plurality of user-activated and/or sensor-activated switches associated with vehicle functions connected to a wireless transmitter, such as RF or infrared. The transmitter includes a battery or other power source. A plurality of the switch clusters are installed on vehicle components, such as on the steering wheel, in a door, in a multifunction switch stalk, or in the backseat, etc. Upon activation of each switch, the transmitter generates a unique signal which is received by the receiver in the vehicle. The receiver then activates the predetermined vehicle function associated with the signal or bus message to appropriate actuator.

The switching system preferably uses the receiver already in use in a vehicle remote entry system. A portable remote entry transmitter selectively generates a signal which is received by the receiver on the vehicle. In response to this signal, the receiver unlocks the door, illuminates entry, or enables the ignition of the vehicle, etc. The operation of such remote entry systems is well-known.

Each of the signals from the transmitters, including the portable transmitter, includes a code portion and a message portion. The code portion of each signal is preferably identical for all transmitters associated with a certain vehicle. The message portion of each signal indicates to the receiver the vehicle function which is to be activated. For example, switches mounted on the steering wheel are associated with predetermined vehicle functions, such as cruise control, or an input device for a graphical user interface.

In operation, upon activation of a switch the remote transmitter generates a first signal which is received by the receiver. The receiver receives the first signal and analyzes the code portion and message portion. If the signal contains the proper code, the receiver activates the predetermined vehicle function associated with the message portion of the signal. For example, upon activation of a switch on the portable remote transmitter, the receiver permits access to the vehicle, such as by unlocking the doors, providing illuminated entry, enabling ignition of the vehicle, etc. Upon reception of a signal associated with the cruise control function, the receiver activates the cruise control function. Upon reception of a signal associated with the graphical user interface input device, the receiver activates the proper vehicle function on the graphical user interface.

Because the transmitters located inside the vehicle are mounted to vehicle components which are attached to the vehicle and movable only within a known limited range (such as the steering wheel or doors) the transmitters can provide much lower output signals than the portable transmitter, thereby increasing battery life of the transmitters also reduces chance of interference with nearby vehicles. Further, because their location is generally or substantially fixed within the vehicle relative to the receiver, the transmission of the signal can be substantially directed toward the receiver, again reducing the output power requirement for the transmitter. In this manner, the wiring in the vehicle can be reduced, as can the assembly time and weight of the vehicle.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
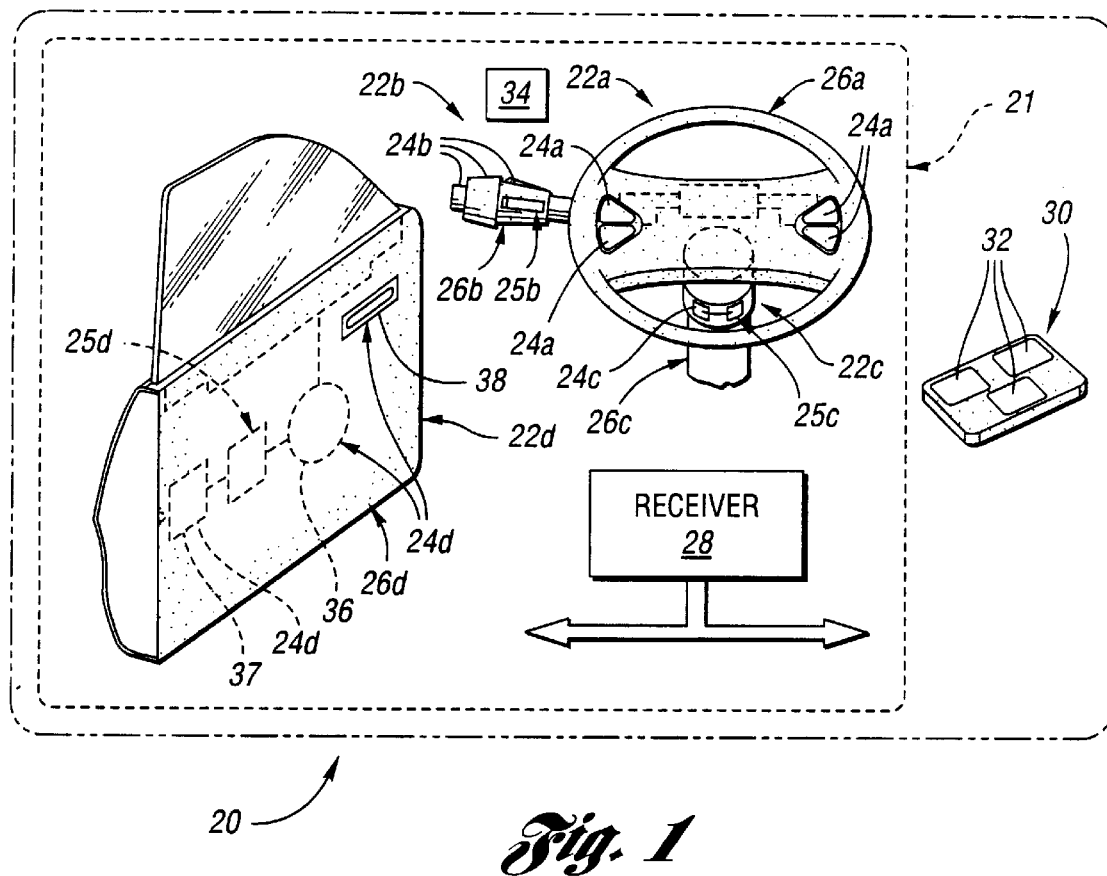
FIG. 1 is a schematic of the vehicle switching system of the present invention.

The vehicle switching system 20 of the present invention is generally shown in FIG. 1 installed in a vehicle 21. A plurality of switch clusters 22a–d each include a plurality of switches 24a–d and a generally fixed transmitter 25a–d mounted on a generally fixed vehicle component 26a–d, such as a steering wheel 26a, multifunction switch stalk 26b, steering column 26c or door 26d (some connections omitted for clarity). A receiver 28 connected to the vehicle bus 29 receives and decodes signals from the transmitters 25a–d.

The switches 24a on the steering wheel 26a are user-activated switches 24a each associated with a predetermined vehicle function, such as cruise control operation, or as an input device, such as a mouse or keyboard or a graphical user interface 34. The switches 24b on the multifunction switch stalk 26b are user-activated switches 24b each operating a predetermined vehicle function such as cruise control, windshield wipers, windshield wash, turn signals, etc. The switches 24c on the steering column 26c are sensor-activated switches 24c, such as a steering wheel rotation sensor 24c such as is utilized in conjunction with active suspension control. The switches 24d on the door 26d include sensor-activated switches 24d such as a window pinch sensor switch 36 and a door close pin switch 37 and user-activated switches 24d, such as seat position control 38.

The vehicle switching system 20 further includes a portable transmitter 30 having a plurality of switches 32. The portable transmitter 30 and receiver 28 are generally as known and utilized for remote entry systems for vehicles. Preferably, the receiver 28 is an RF receiver, although optical receivers such as infrared receivers or other known radio wave receivers can also be used.

Although the fixed transmitters 25a–d are mounted on vehicle components 26a–d, the transmitters 25 are still electrically isolated or "remote" from the receiver 28, like the portable transmitter 30, in that the communication between the transmitters 25, 30 and receiver 28 is wireless. Based upon signals received from one of the fixed transmitters 25*a–d* or the portable transmitter 30, the receiver 28 activates the appropriate vehicle functions on the bus 29, such as locking or unlocking the doors, illuminated entry, enable the ignition of the vehicle, cruise control, or graphical user interface input.

Figure 2:
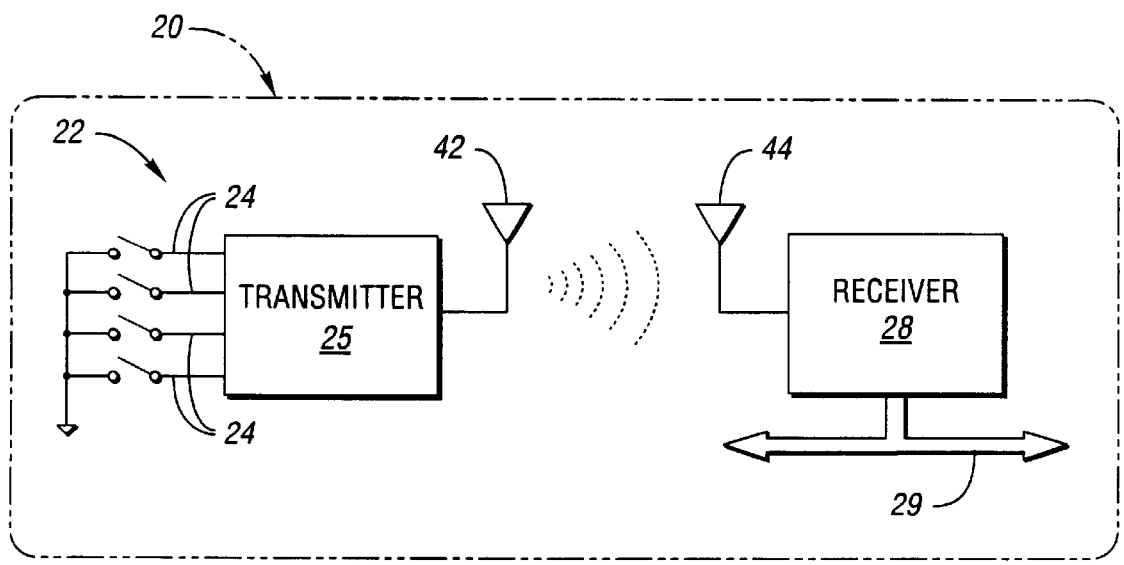
FIG. 2 is a lower level schematic of the vehicle switching system of FIG. 1.

As can be seen in FIG. 2, each switch cluster 22 generally comprises the plurality of switches 24 connected to the transmitter 25. Upon activation of one or more of the switches 24, the transmitter 25 generates a signal which is sent by a transmitting antenna 42, also mounted in the switch cluster 22 on the vehicle component 26. The signal is received by a receiver antenna 44 and the receiver 28. Preferably the transmitter 25 generates a signal having a code portion and a message portion. The code portion of a signal is preferably constant, and the message portion of the signal identifies the particular switch 24 that was activated by the user or a sensor. The receiver 28 receives the signal, and analyzes the code portion to determine that the signal is an authorized code for that vehicle. If the code is an authorized code, the receiver 28 analyzes the message portion of the signal and sends a signal on the vehicle bus 29 to activate the predetermined vehicle function associated with the particular switch 24 activated by the user or sensor.

The vehicle switching system 20 of the present invention reduces wiring in the vehicle, particularly for difficult to wire locations without multiplexing. Further, because the vehicle switching system 20 utilizes the receiver 28 which is already included in a remote entry system of the vehicle, the additional cost and the manufacture of the assembly of the vehicle is reduced.

It should be recognized that the switches 24 and the transmitter 25 could be mounted on other vehicle components 26 than those illustrative examples described above, such as in headliners, visors, etc. Although the vehicle components 26*a–d* are each somewhat movable, (such as by tilting or rotating the steering wheel 26*a,* opening door), the transmitters 25 are in a substantially fixed location relative to the receiver 28. Therefore, reduced power output of the transmitters 25 is permissible, extending battery life.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A vehicle switching system comprising:

a plurality of switch clusters, each comprising a transmitter and a plurality of associated switches each associated with a vehicle function, each transmitter generating a remote signal upon activation of one of said associated switches, each of said remote signals containing a code portion and a message portion, said code portion of each of said remote signals being identical, said message portion of each of said remote signals differing, each of said plurality of switch clusters mounted on a different vehicle component; and a receiver activating said associated vehicle functions upon receiving said remote signals.

2. The vehicle switching system of claim 1 wherein one of the plurality of switches is activated by a vehicle sensor.

3. The vehicle switching system of claim 1 wherein a vehicle component is attached to said vehicle and movable relative to said vehicle.

4. The vehicle switching system of claim 1 wherein said remote signals are radio frequency signals.

5. The vehicle switching system of claim 1 wherein said remote signals are infrared signals.

6. The vehicle switching system of claim 1 wherein said receiver is mounted in said vehicle.

7. The vehicle switching system of claim 1 wherein one of the plurality of switch clusters comprises a remote entry system.

8. The vehicle switching system of claim 1 wherein said receiver activates a remote entry system upon receiving a remote signal.

9. The vehicle switching system of claim 1 wherein a vehicle component is a steering wheel.

10. The vehicle switching system of claim 1 wherein each of the switches in each of the plurality of switch clusters is user-activated.

11. The vehicle switching system of claim 10 wherein each of the switches in each of the plurality of switch clusters is a user activatable button or a rotatable knob.

\* \* \* \* \*